United States Patent [19]
Smiley

[11] 3,747,021
[45] July 17, 1973

[54] WIDE RANGE CONTINUOUSLY TUNABLE THIN FILM LASER

[75] Inventor: Vern N. Smiley, San Diego, Calif.

[73] Assignee: The United States of America as represented by the Secretary of the Navy, Washington, D.C.

[22] Filed: July 18, 1969

[21] Appl. No.: 842,914

[52] U.S. Cl. ........................................ 331/94.5
[51] Int. Cl. ............................................. H01s 3/00
[58] Field of Search ..................... 331/94.5; 356/112

[56] References Cited
UNITED STATES PATENTS
3,217,591  11/1965  Barr et al. .......................... 356/112
3,439,169  4/1969  Lynch ................................. 331/94.5

FOREIGN PATENTS OR APPLICATIONS
1,116,514  6/1968  Great Britain ..................... 331/94.5

OTHER PUBLICATIONS
"Volume Excitation of an Ultrathin Single-Mode CdSe Laser; Stillman et al.; Applied Physics Letters; Oct. 66; Vol. 9, No. pg. 268–pg. 268–269.
End-Pumped Laser Emission from cadmium Sulfide Selenide Bombarded by an Electron Beam; Jour. App. Physics; Vol. 38; June 1967; Tait et al.; pg. 3035–3036.

Primary Examiner—Ronald L. Wibert
Assistant Examiner—V. P. McGraw
Attorney—Joseph C. Warfield, Jr., George J. Rubens and John W. McLaren

[57] ABSTRACT

A thin film of laser material is prepared from two different compounds known to have lasing capabilities at different wavelengths and also having one component in common. The two compounds are caused to be deposited in a thin film layer of varying concentration so as to produce a final thin film of lasing material which changes in composition along a selected axis from a layer of laser material comprising substantially wholly one of the compounds, through varying gradient degrees of relative concentrations of the two compounds to a final gradient which may comprise substantially wholly the other compound of laser material. A source of excitation energy is provided, together with means for producing relative motion between the thin film of excitation energy so that the laser output is continuously tunable over an extremely broad band of outputs.

4 Claims, 3 Drawing Figures

PATENTED JUL 17 1973 3,747,021

INVENTOR.
VERN N. SMILEY
BY
ATTORNEYS

WIDE RANGE CONTINUOUSLY TUNABLE THIN FILM LASER

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED APPLICATIONS

The subject matter of this invention is related generally to co-pending applications Ser. No. 842,938 titled "Thin Film Laser", now U.S. Pat. No. 3,579,142, Ser. No. 842,939, titled "Narrow Band Tunable Laser Oscilator Amplifier," now U.S. Pat. No. 3,573,654, Ser. No. 842,915, titled "Continuously Tunable Thin Film Laser Employing the Electric Field Effect," now U.S. Pat. No. 3,573,653, and Ser. No. 842,917, titled "Thin Film Active Interference Filter," now U.S. Pat. No. 3,579,130, all filed in the name of applicant on the date of July 18, 1969.

BACKGROUND OF THE INVENTION

Although a number of laser devices of varying configuration and arrangements have been devised employing relatively thin films of laser material in one degree or another, none is known at present to embrace the capability of continuous tuning over a large spectral width of laser output. Some of the known and prior art thin film lasers are capable of producing a laser beam in a direction parallel to the principal plane of the thin film, while others are known to be capable under certain conditions of producing a laser beam in a direction perpendicular to the principal plane of the thin film laser material, affording the desirable characteristic of a relatively large laser beam aperture. However, of all the known lasers which may be considered to be tunable, the span of such tunability is relatively very small, covering only very narrow spectral bandwidths which typically may be of only a few Angstrom units in the visible spectral region, at most. Applicant has devised a very wide band, continuously tunable, thin film laser which may readily be devised to be continuously tunable over more than 1,000 Angstrom units in the visible spectral region.

SUMMARY OF THE INVENTION

The concept of the present invention contemplates a thin film of laser material which may comprise two compounds that may be designated as AB and AC. These two compounds have different resonant lasing frequencies which may be separated by a few thousand Angstrom units, for example. The film of laser material comprising these two compounds is caused to be created with a varying concentration of one of the compounds relative to the other of the compounds in the thin film of laser material and may extend from one extreme of concentration comprising substantially only one of the compounds through a continuously varying gradient comprising a mixture of the two compounds in relative concentrations to an extreme concentration comprising substantially only the other compound. This varying gradient will extend in the plane of the film and along a major axis of the thin film.

Another way in which the relationships within the thin film laser material may be described is by expressing the composite compound deposit as being of the form $AB_xC_{1-x}$, where $x$ is the relative concentration of B. When $x = 1$, the composite comprises substantially wholly the AB compound but when $x = 0$, the composite is substantially wholly the AC compound. Accordingly, $x$ may be considered as the concentration index and when $x$ is made to vary with distance along a principal axis of the thin film of laser material, that concentration index is a function of distance along the gradient axis.

A source of excitation energy is provided and appropriate means are adapted to produce relative movement between the thin film of laser material along its gradient axis and the source of excitation energy so that the frequency of the lasing output from the thin film of laser material varies substantially from the resonant lasing frequency of one of the two compounds, through a changing gradient, to the resonant lasing frequency of the other of the two compounds employed in the thin film laser material. Thus, the concept of the present invention provides a continuously tunable laser output which may be of the order of 1,000 Angstrom units or more in the visible spectral region in a typical embodiment.

Accordingly, it is a primary object of the present invention to provide a narrow bandwidth continuously tunable laser.

Another most important object of the present invention is to provide a narrow bandwidth continuously tunable laser operating over a very wide spectral region and in a single mode of operation.

Another important object of the present invention is to provide a narrow bandwidth continuously tunable laser operative as a coherent oscillator or a continuously tunable coherent amplifier.

A further object of the present invention is to provide a narrow bandwidth continuously tunable laser, operative over a very wide spectral region and in a single mode of operation, which may be excited to lasing level with either optical energy, electron beams, or electron injection.

These and other features, advantages and objects of the present invention will be better understood from the following description of several embodiments which are illustrated in the accompanying drawings.

DESCRIPTION OF THE PREFERRED EMBODIMENTS

Figure 1:
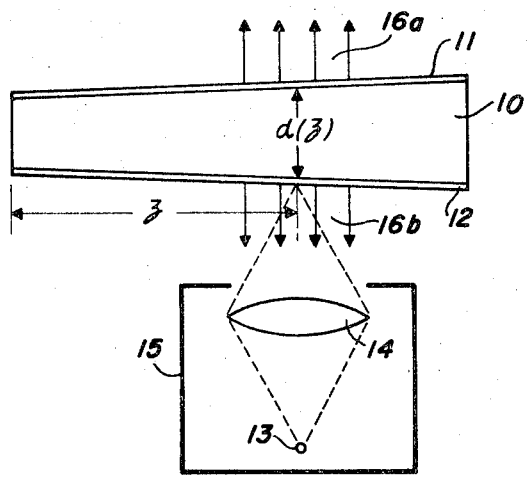
FIG. 1 is a partially cross-sectional, schematic illustration of an embodiment of the present invention.

There is illustrated in FIG. 1, an embodiment of the present invention which includes a thin, wedge-shaped film of laser material 10 having coated thereon on either side dielectric, or metallic films 11 and 12 possessing a relatively high degree of reflectance over the spectral region of interest. The thin film of laser material has a small wedge angle and may comprise two compounds designated as AB and AC for purposes of explanation, where the two components involved which are not common to both compounds, i.e., B and C are varied in their relative concentration so that a gradient is produced, preferably along a major dimension of the plane of the thin layer of laser material.

If the composite layer is expressed in the form $AB_xC_{1-x}$, where $x$ is the relative concentration of B, $x$ may be varied from 0 to 1. When $x = 1$, the compound is substantially wholly comprised of AB and when $x = 0$, the compound is substantially comprised wholly of AC. In between these extremes, there is a continuous and gradual variant in the concentration of B relative to C. If, as is taught by the concept of the present invention, the concentration index, $x$, is made to vary with distance along a major dimension or axis, such as the plane of the thin film, the concentration index $x$ will be a function of the distance, $z$, as shown in FIG. 1, and will have a gradual and continuous gradient along that direction.

If it be considered, for example, that the composite thin film employed in a particular embodiment of the present invention comprises $CdSe_xS_{1-x}$, the relative concentration along the axis of the gradient may be made to produce a change in the resonant frequency of operation when a source of excitation energy is employed which can be controllably positioned relative to the gradient. Assuming the composite layer of laser material comprises $CdSe_xS_{1-x}$, when $x = 1$, the composite is reduced to wholly CdSe which has a peak laser output at about 6,900 A; when $x = 0$, the composite thin layer is almost wholly CdS which has a characteristic peak laser output at about 4,900 A. Accordingly, the extremes of variation of the resonant frequency of the laser material will nominally be between 6,900 A and 4,900 A. In addition the wedge angle is such that the cavity resonance also changes simultaneously so as to be in tune with the material resonance at all positions along the film axis. This wedge is such that the optical path length between reflectors is always a multiple of one-half wavelengths of the desired resonant frequency. When concentration of the components in the thin film of laser material vary along the gradient of the $z$ axis as illustrated in FIG. 1, (that is, where $x$ also has a gradient varying between 1 and 0) the peak laser output will vary commensurately and continuously between 6,900 A and 4,900 A. The composite layers 10, 11 and 12 may be appropriately deposited on a suitable substrate material (not shown) if desirable.

An appropriate source of excitation energy 13 is provided together with a suitable optical system 14 mounted on a moveable support 15. When the excitation energy 13, as focused upon the thin film of laser material 10, is absorbed in sufficient quantities by the thin film of laser material 10, a laser beam output 16 is produced. The laser beam output 16 will therefore have a wavelength which may be expressed in terms of A, and which will commensurate with the disposition of the excitation energy impinging upon the thin film laser relative to the gradient axis which extends generally along the plane of the thin film of laser material 10 and is a function of the distance $z$ as shown in FIG. 1.

In accordance with the concept of the present invention, it is only necessary that relative movement between the gradient axis of the thin film of laser material 10 and the source of excitation energy impinging thereon be developed to change the resultant resonant frequency of the laser beam output 16. Thus, the source of excitation energy 13, together with its optical system 14, may be disposed along the gradient axis by a controllable and moveable support 15 as illustrated in FIG. 1. Alternatively, within the concept and teaching of the present invention, the thin film of laser material 10 may be made to move substantially along its gradient axis relative to a stationary source of excitation energy, such as that shown at 13, together with its appropriate optical system 14 in FIG. 1.

The material CdSe S, used as an illustrative example for purposes of explanation, is a single crystal semiconductor although other materials may be utilized. One method of producing the desired linear gradient in the general case used for illustration employing the composite $AB_xC_{1-x}$ may be achieved by forming a thin wedge-shaped film by vapor deposition from two separate sources, one containing AB and the other containing AC while employing a moving slit mask to continuously vary the rate of deposition of AB as compared to the rate of deposition for AC. In addition, the total rate of deposition is varied so as to produce a composite film of continuously varying thickness. In some cases it may be desirable to recrystallize the deposited films by means of heat treatment.

The thin layer of laser material may be a single layer or may comprise multiple layers of films deposited on the surfaces of the laser material as shown in FIG. 1. The two layers of films 11 and 12 are of high reflectance characteristic within the spectral region of interest. Additionally, the layer of laser material 10 is of a generally wedge configuration having a very small wedge angle. It will be appreciated by those skilled and knowledgeable in the art that this device then becomes a FABRY-PEROT wedge interference filter whose resonant wavelength may be expressed by the relation $$N \lambda_{res} = 2nd \qquad (1)$$

where N is the order of thickness in terms of half-wavelengths, $n$ is the index of refraction of the laser material, and $d$ is the actual thickness at any position along the film plane. The variation in $\lambda_{res}$ must just match the variation in peak wavelength of emission of the laser material. When this condition is met, the laser will oscillate at any desired wavelength within the maximum obtainable range when suitably excited or energized at the appropriate position $z$ as illustrated in FIG. 1.

The laser excitation may comprise focused optical energy or a small aperture electron beam. The optical energy which is produced by the source of excitation energy 13 as illustrated in FIG. 1 may comprise a gas discharge device of a non-coherent character, such as a Xenon lamp, or coherent light as produced by another laser. As previously mentioned and explained, a continuously variable output of wavelength may be obtained by continuously varying the relative positions of the source of excitation energy and the thin film of laser material. When electron beam excitation is used no coatings will be employed on that surface on which the beam impinges.

The high reflectance coatings 11 and 12 as illustrated in FIG. 1, must be of broadband character so that they offer relatively high reflectance over the entire range of wavelengths of operation of the laser yet must offer low reflectance to the excitation wavelengths. The laser material itself, as illustrated at 10 in FIG. 1, must be thin enough to ensure single mode operation. That is, only one resonant frequency should be produced at a particular position of the source of excitation energy 15 relative to the major axis of the laser material 10. A Fabry-Perot interferometer will exhibit axial resonances spaced every half wavelength. Thus, the allowable thickness of the laser material 10 must be small enough so that only one resonance may occur within the bandwidth of the laser material. For a thin Fabry-Perot cavity the wavelength separation between the successive resonances may be expressed as, $$\Delta\lambda = \frac{\lambda_2 \lambda_1}{2nd} = \frac{\lambda_0^2}{2nd} \quad (2)$$

where $\lambda_1$ and $\lambda_2$ are two neighboring resonances and $\lambda_0$ is the mean wavelength of oscillations. The optical thickness $nd$ then must be less than, $$\frac{\lambda_0^2}{2\Delta\lambda} \quad (3)$$

For example, if $\lambda 0 = 6,900$ A and the laser material has a bandwidth of 100 A, the maximum thickness of the wedge-shaped laser material must be less than 24 microns. The laser material must of necessity have an extremely small wedge angle so that the lasing phenomenon may be maintained in the manner described above throughout the full range of operation.

If optical excitation is used as is illustrated in FIG. 1, the source of excitation energy 13 must provide an output which is broad enough to cover the absorption bands for the two different lasing materials that are present at the extreme ends of the wedge-shaped thin film of laser material previously described. Additionally, the coating 12 which is on that side of the thin film of laser material 10 facing the source of radiant energy 13 must not offer too high a reflectance to the energy emitted from the excitation source 13.

When the source of excitation energy 13 is optical in nature, its radiation will be of shorter wavelength than the shortest wavelength of lasing operation of the laser material. It may consist of a non-coherent light source such as an arc lamp or a gas discharge device; alternatively, a coherent light source such as a single or multiple wavelength laser may be used as the source of excitation energy. In addition, multiple photon absorption may be employed for energizing the laser of the present invention, whereby two or more photons combine to raise an atom of the laser material to two or more times the energy of one photon. Accordingly, longer wavelength radiation may be used in the laser pump or source of excitation energy.

Figure 2:
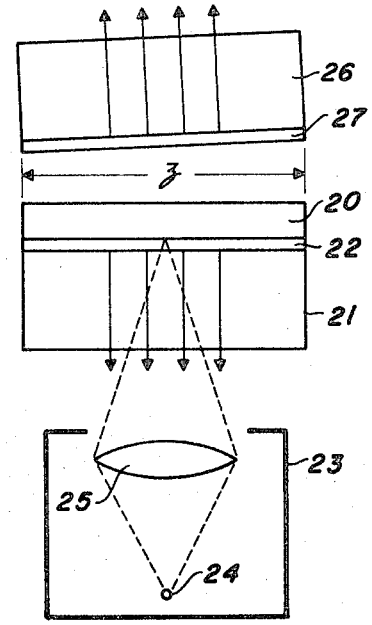
FIG. 2 is a partially cross-sectional, schematic illustration of a variant embodiment of the present invention.

FIG. 2 illustrates a variant embodiment of the present invention. A thin film of laser material 20 is supported on a substrate 21 with a film 22 of high reflectance character positioned therebetween. The substrate 21 and high reflectance film 22 are selected to have satisfactory transmittance characteristics relative to the excitation energy received from a suitable source 23. The excitation energy source 23 may comprise a coherent or non-coherent light generator 24 similar to that described in connection with the illustration of FIG. 1, and having an appropriate lens system 25 to focus the excitation energy.

A second substrate 26 disposed at slight angle relative to the plane of the first reflectance film 22, supports a second reflectance film 27 so that the assembly comprises a wedge-shaped Fabry-Perot laser cavity. For the general case employing a composite deposition $AB_xC_{1-x}$ for illustrative purposes, the desired gradient film of laser material may be achieved by heating a thin wafer of AB such that a temperature gradient along the z direction as illustrated in FIG. 2 is established while the wafer is in an atmosphere which is rich in C. For example, a thin wafer of crystalline CdSe heated with a temperature gradient in an atmosphere of $H_2S$ or other vapor rich in sulphur will produce the desired results.

Figure 3:
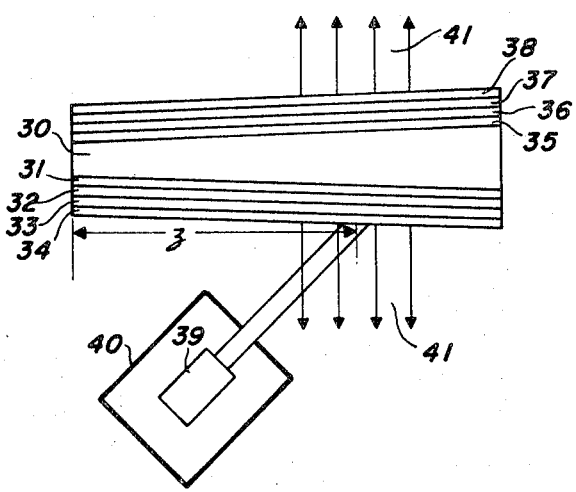
FIG. 3 is a partially cross-sectional, schematic illustration of another variant embodiment of the present invention.

FIG. 3 illustrates a variant embodiment of the present invention wherein a thin film of laser material 30 is formed in a slightly wedge-shaped configuration of the thin film of laser material 10 as is illustrated in FIG. 1. Extremely thin layers of material 31, 32, 33, and 34 selected to form a high reflectance composite on one side of the thin film of laser material 30 and similar extremely thin films of material 35, 36, 37, and 38 are formed on the opposite side of the thin film of laser material 30. Where it is not possible because of the parameters involved in a particular application of the concept of the present invention to employ multiple layers of substantially quarter wavelength thickness of the emitted laser energy, it may be possible to employ an appropriate single metallic film to admit the energy of the electron beam while providing a desirable degree of optical reflectance.

A source of excitation energy in the form of an electron beam gun 39 is mounted on a support 40 arranged to be moveable along the principal axis of the thin film of laser material 30.

The electron beam source 39 pumps the thin film of laser material 30 with exciting energy, raising it to a lasing level so as to produce laser beams at 41. The thin film of laser material as illustrated in FIG. 3 has the same characteristics of varying composition in concentration index along its principal plane axis so that it varies from a concentration of substantially wholly one lasing material at one end, through a gradually and continuously varying concentration of two laser materials, to a concentration of substantially wholly the other laser material at the other end of its principal plane axis. Accordingly, when the thin film of laser material 30 and the source of excitation energy 39, in the form of an electron beam, are moved relative to each other along the principal axis of the thin film of laser material 30, a continuously tunable laser output is produced which has a wavelength commensurate with the composition and film thickness at the position of the excitation beam relative to the principal plane axis of the thin film of laser material 30.

When an electron beam source of exciting energy is employed as illustrated in FIG. 3, reflectance coatings 31 through 34 positioned on the side of the thin film of laser material 30 nearest the source of excitation energy 39 may be eliminated to ensure that the maximum amount of electron beam energy reaches the laser material. However, it is possible to use coatings so extremely thin that electrons may be transmitted through while the laser energy is reflected. Desirable, extremely thin reflectance coatings may be accomplished within the state of the art employing very thin metallic or dielectric coatings.

It will be appreciated by those skilled and knowledgeable in the art that elements of the three embodiments of the present invention as disclosed and illustrated in FIGS. 1 and 2, and 3 may be interchanged within the teaching and concept of the present invention. For example, it may be desirable to employ an optical source of excitation energy as disclosed in FIG. 1 with the thin film of laser material and reflectance coatings in the configuration as illustrated in FIG. 3. Conversely, it may be desirable, or necessary in particular applications, to employ a source of excitation energy such as the electron beam source 39 illustrated in FIG. 3 with a thin layer of laser material as illustrated in a configuration as shown in FIGS. 1 or 2. Moreover, any desirable number of reflectance coatings on one or both plane surfaces of the thin film of laser material may be employed within the teaching and concept of the present invention. Such coatings exhibit varying characteristics as may be desirable or necessary for the optimum or proper operation of the laser over particular spectral regions of interest and variations of wavelength of laser outputs.

The concept and teaching of the present invention contemplates that the laser assembly may be used as an amplifier or an oscillator. In the amplifier configuration in addition to the source of excitation energy, an input signal is focused onto one surface of the thin film of laser material and the amplified output signal emits from the other side of the thin film of laser material. Regenerative amplification with reflecting surfaces as shown in FIGS. 1, 2, or 3 may be used or traveling wave amplification may be obtained. In the latter case, antireflective coatings are applied to both surfaces of the thin film of laser material and a configuration of laser material such as is illustrated in FIG. 3 is employed. In the amplifier configuration, the source of excitation energy which pumps the laser material (whether it be an optical energy source or an electron beam) may impinge upon the thin film of laser material at an angle rather than perpendicular to the film plane. When the exciting energy is optical in character, the input signal and exciting radiation may both be brought into the film perpendicular to the film plane by the use of a beam splitter; when an electron beam is employed, the energy may be redirected through a right angle by a magnetic field. These arrangements allow the input signal from the signal source and the energy from the excitation source to be applied to the laser material without one blocking the other. Alternatively, the source of optical energy or the electron beam may be applied at an angle to the plane of the thin film of laser material and need not be applied perpendicular to the base of the device.

From the foregoing descriptions of several embodiments it will be appreciated that the teaching and concept of the present invention provides a continuously tunable thin film laser of extremely wide range not realized heretofore. Moreover, the reproducibility of the tuned laser output is enhanced in its precision and the concept of the invention may be advantageously embodied in a variety of different configurations employing numerous combinations of materials.

In the described preferred embodiments employed for purposes of illustration and explanation it should be appreciated that the illustrations of FIGS. 1, 2, and 3 are not drawn to scale in the interests of simplicity and clarity in understanding their respective manners of operation. Those skilled and knowledgeable in the art will appreciate that the extremely thin films and coatings referred to in the foregoing explanations are of the order of a relatively few wavelengths of the energy involved and that the proportions shown in the illustrated embodiments are not intended to be a scalar representations.

Obviously many modifications and variations of the present invention are possible in the light of the above teachings. It is therefore to be understood that within the scope of the appended claims the invention may be practiced otherwise than as specifically described.

What is claimed is:

1. A wide range continuously tunable thin film laser for producing single mode laser output perpendicular to the principal plane of the film comprising:
   a thin film of laser material including at least two compounds having a common element,
   said thin film having a gradient varying in thickness in a thin wedge configuration along a major axis in which the relative concentration of the uncommon components of said two compounds varies, and having a maximum optical thickness $nd$ of less than $\lambda_0 2/2\Delta\lambda$, where $n$ is the effective index of refraction of the laser material, $d$ is its actual thickness at any position along the film plane, $\lambda_0$ is the mean wavelength of oscillations, and $\Delta\lambda$ is the difference in wavelength between adjacent resonant frequency portions of the film;
   a source of excitation energy;
   means for focusing said energy upon said film; and
   means for causing relative movement between the focused excitation energy and said thin film along its gradient.

2. A wide range continuously tunable thin film laser for producing single mode laser output perpendicular to the principal plane of the film comprising:
   a thin film of laser material including at least two compounds having a common element,
   said thin film having a gradient along a major axis in which the relative concentration of the uncommon components of said two compounds varies, and having a maximum optical thickness $nd$ of less than $\lambda_0 2/\Delta\lambda$, where $n$ is the effective index of refraction of the laser material, $d$ is its actual thickness at any position along the film palne $\lambda_0$ is the mean wavelength of oscillations, and $\Delta\lambda$ is the difference in wavelength between adjacent resonant frequency portions of the film;
   at least one film of high reflectance in the spectral region of interest on said thin fim of laser material,
   said films of high reflectance having varying thickness as a function of distance along the plane of said thin film of laser material such that the maximum reflectance is maintained for all resonant frequencies along the plane of said film of laser material within the spectral region of interest;
   a source of excitation energy;
   means for focusing said energy upon said film; and
   means for causing relative movement between the focused excitation energy and said thin film along its gradient.

3. A wide range continuously tunable thin film laser for producing single mode laser output perpendicular to the principal plane of the film comprising:
   a thin film of laser material including at least two compounds having a common element,
   said thin film having a gradient along a major axis in which the relative concentration of the uncommon components of said two compounds varies, and having a maximum optical thickness $nd$ of less than $\lambda_0 2/2\Delta\lambda$, where $n$ is the effective index of refraction of the laser material, $d$ is its actual thickness at any position along the film plane, $\lambda_0$ is the mean wavelength of oscillations, and $\Delta\lambda$ is the difference in wavelength between adjacent resonant frequency portions of the film;

a film of high reflectance in the spectral region of interest on each side of said thin film of laser material;

a source of excitation energy;

means for focusing said energy upon said film; and means for causing relative movement between the focused excitation energy and said thin film along its gradient.

4. A wide range continuously tunable thin film laser for producing single mode laser output perpendicular to the principal plane of the film comprising:

a thin film of laser material including at least two compounds having a common element, said thin film having a gradient along a major axis in which the relative concentration of the uncommon components of said two compounds varies, and having a maximum optical thickness $nd$ of less then $\lambda_0 2/2\Delta\lambda$, where $n$ is the effective index of refraction of the laser material, $d$ is its actual thickness at any position along the film plane, $\lambda_0$ is the mean wavelength of oscillations, and $\Delta\lambda$ is the difference in wavelength between adjacent resonant frequency portions of the film;

multiple layer films of high reflectance in the spectral region of interest on said thin film of laser material;

a source of excitation energy;

means for focusing said energy upon said film; and means for causing relative movement between the focused excitation energy and said thin film along its gradient.

* * * * *

UNITED STATES PATENT OFFICE
CERTIFICATE OF CORRECTION

Patent No. 3,747,021          Dated July 17, 1973

Inventor(s) VERN N. SMILEY

It is certified that error appears in the above-identified patent and that said Letters Patent are hereby corrected as shown below:

Claims 1, 3, and 4, the expression "$\lambda_o 2/2\Delta\lambda$" should read -- $\lambda_o^2/2\Delta\lambda$ -- . Claim 2, the expression "$\lambda_o 2/\Delta\lambda$" should read -- $\lambda_o^2/2\Delta\lambda$ -- . Claim 2, line 12, "palne" should read -- plane, -- . Claim 4, line 9, "then" should read -- than -- .

Signed and sealed this 22nd day of January 1974.

(SEAL)
Attest:

EDWARD M. FLETCHER, JR.          RENE D. TEGTMEYER
Attesting Officer          Acting Commissioner of Patents